July 8, 1941.　　　W. E. THORNE　　　2,248,398

FACTORY TRUCK

Filed Nov. 8, 1939　　　2 Sheets-Sheet 1

Inventor

William E. Thorne.

By Samuel H. Davis.
Attorney

July 8, 1941.  W. E. THORNE  2,248,398
FACTORY TRUCK
Filed Nov. 8, 1939   2 Sheets-Sheet 2

Inventor
William E. Thorne

By Samuel H. Davis
Attorney

Patented July 8, 1941

2,248,398

UNITED STATES PATENT OFFICE 2,248,398

FACTORY TRUCK

William E. Thorne, Lansing, Mich., assignor to Lansing Company, Lansing, Mich., a corporation Application November 8, 1939, Serial No. 303,471

1 Claim. (Cl. 280—46)

This invention relates to factory trucks, more particularly to handle and wheel "dolly" devices or mechanism designed to be pushed under the end of the body of a factory truck whereby the end of the loaded body of a factory truck or the like may be lifted somewhat, enabling the operative to draw the truck about, turn the same as desired, and to reset the truck upon its own fore feet by removing the handle and wheels attachment.

It is the object of this invention to construct a handle attachment of the character specified in this application, having parts of special construction and arrangement, whereby it is believed an especially strong, durable and easily operated truck lifting and wheel attaching mechanism results, which will not break down or get out of order in use, and which is an improvement mechanically of like truck adjuncts with which this applicant is acquainted.

By the accompanying drawings the special construction and arrangement of the elements of this invention are illustrated, and Fig. 1 of the drawings represents a factory truck with this construction and arrangement of parts incorporated.

Throughout the drawings and specification the same number is used to refer to the same part.

Figure 1:
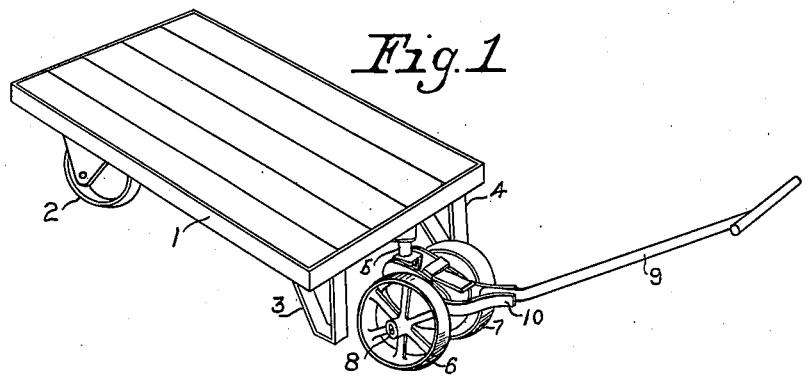
Figure 2:
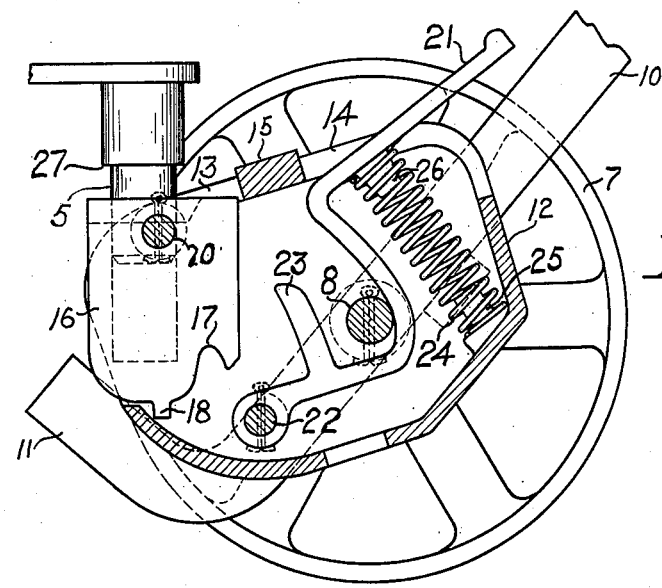
Fig. 2 shows on a somewhat larger scale of drawing, a vertical sectional view of the attachment herein described, the socket member being in its lowered position.

Considering the drawings, the truck 1 has a rear wheel 2, and front legs or feet 3 and 4 between which there is a cylindrical downwardly extending post or coupling pin 5. Removably engaging the post is a handle and wheels attachment comprising wheels 6 and 7 on a transverse axle 8. A handle 9 has its forked end 10 pivotally connected with the axle. In Fig. 2 it will be observed that the lower ends 11 of the fork are turned upwardly. This arrangement permits the handle to rest in an erect position when turned upwardly to be out of the way of persons passing the truck.

Pivotally carried by the axle is a casing or housing 12 which usually has the two openings 13 and 14 with a cross piece 15 between them. As ordinarily made the piece is somewhat thicker than the wall of the casing, for added strength.

Located in opening 13 of the casing is a part termed for the purposes of this description the socket member 16. In its lower end is formed a notch 17 below which extends a stop lug 18 to be further mentioned. Pivots 19 and 20 couple the member to the interior of the casing, as shown in Fig. 6.

Projecting through the opening 14 in the casing is the foot lever 21 having a pivotal connection 22 with the lower part of the interior of the casing and provided with an up-raised finger 23 near the pivot. The lever is controlled by a coil spring 24 with ends engaging lug 25 in the casing and like lug 26 on the lever.

As best shown in Fig. 2 the cylindrical post 5 of the truck has an upper shoulder 27 provided to engage the rising socket member when the handle is operated as a lever upon the fulcrum projections 28 and 29 at the sides of the casing.

Figures 3, 4:
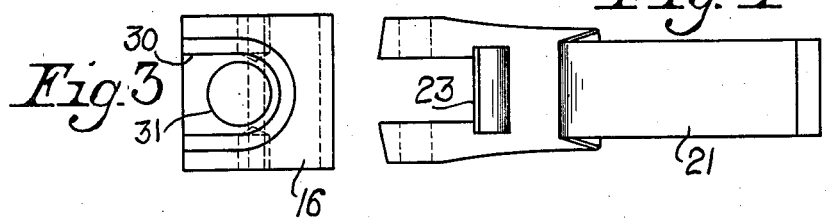
Fig. 3 represents a top or plan view of the socket member.
Fig. 4 is a top or plan view of the foot lever.
Figure 5:
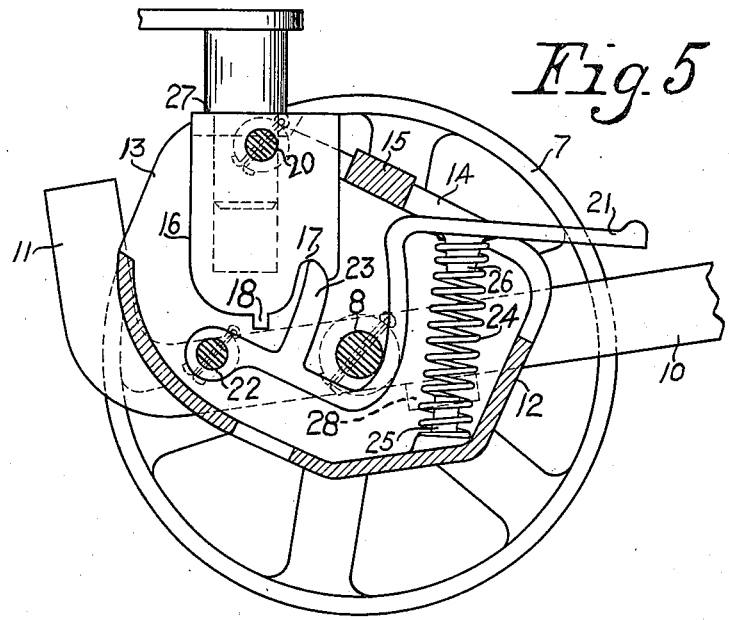
Fig. 5 is a vertical sectional view similar to Fig. 2, showing the socket member in its raised position.
Figure 6:
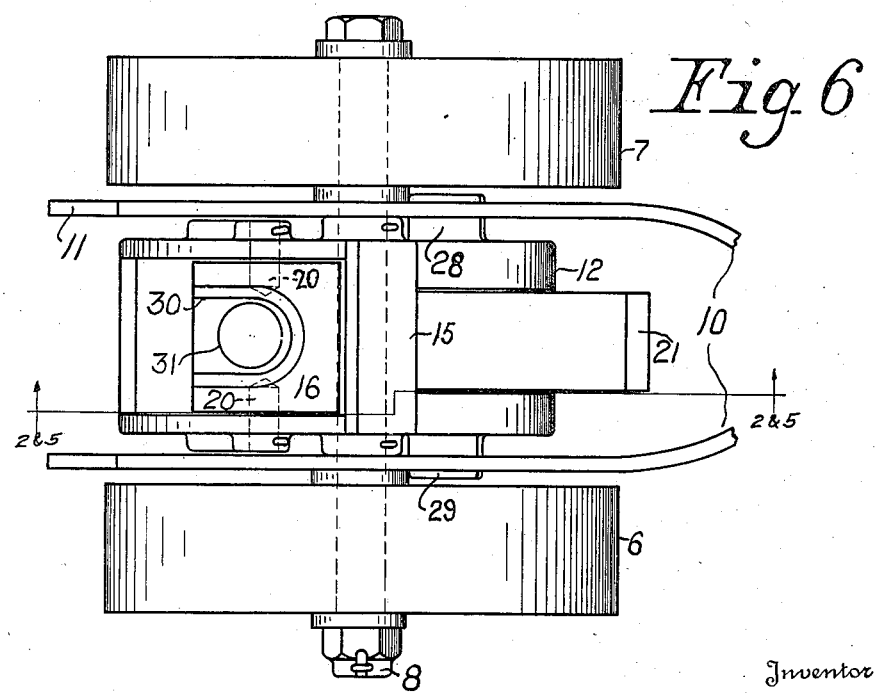
Fig. 6 is a top or plan view of the handle and wheels attachment of the truck, showing all parts thereof assembled.

As best shown in Figs. 3 and 6 the socket member has an open recess 30 and a cylindrical socket 31 for the post 5, as best shown in Figs. 3 and 6.

In operation, the parts of the handle and wheel attachment being in the lowered positions as set out in Fig. 2, the said attachment may be pushed under the front of the truck which is resting on the front feet, the post enters the open recess of the socket member and then stands directly over the socket formed to receive it. The pivotal displacement of the socket member is prevented by the contact of the stop lug and interior of the casing as shown in Fig. 2. Then if the handle is moved downwardly the casing is turned on the axle with the result that socket member is raised and the post engaged. At the same time automatically the finger of the spring controlled lever slips into the notch of the socket member, and the connection with the truck is maintained until the lever and notch are disengaged by the operator. The socket member is raised into contact with the shoulder of the truck post and the end of the truck may now be lifted and the truck pulled about and turned as desired.

The notch and finger construction constitute a particularly advantageous feature of this invention, as the socket member cannot be unintentionally released thereby allowing the socket member to drop. The operator must release the notch and lever finger engagement when so desired. In this manner a defect found in a number of "dolly" attachments of this nature is entirely avoided. Releasing the foot lever and raising the handle allows the handle and wheels attachment to be detached from the truck as is thought to be clear from the description hereinabove.

Having now described this invention, I claim:

In a factory truck attachment, an axle, a pair of wheels attached to the ends of the axle, a casing pivotally carried by the axle, said casing having openings in the top, a handle pivotally carried by the axle and having an upturned lower end whereon the handle may be positioned vertically, said casing having outwardly projecting fulcrum blocks arranged to contact with the handle, a socket member suspended pivotally vertical in one of said top openings of the casing, said member having a vertical side recess and a vertical socket portion constructed to admit and engage a truck post, said socket member having a projecting lug arranged to contact with the casing when said handle is raised thereby positioning the socket vertically, the said socket member having a notch located adjacent to the said lug, a foot lever extending outwardly through one of the said openings of the casing, a spring adapted to hold the lever raised, said lever passing downwardly below the axle and having an upwardly projecting finger constructed and arranged to be engaged and disengaged with the said notch by the movements of the said casing and foot lever.

WILLIAM E. THORNE.